US012732613B2

(12) United States Patent
Dai

(10) Patent No.: US 12,732,613 B2
(45) Date of Patent: Sep. 8, 2026

(54) SYSTEMS AND METHODS FOR INTELLIGENT QUANTIZATION

(71) Applicant: Agora Lab, Inc., Santa Clara, CA (US)

(72) Inventor: Wei Dai, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 0 days.

(21) Appl. No.: 18/976,029

(22) Filed: Dec. 10, 2024

(65) Prior Publication Data

US 2026/0164028 A1 Jun. 11, 2026

(51) Int. Cl.
*H04N 19/124* (2014.01)
*H04N 19/147* (2014.01)
*H04N 19/176* (2014.01)

(52) U.S. Cl.
CPC ......... *H04N 19/124* (2014.11); *H04N 19/147* (2014.11); *H04N 19/176* (2014.11)

(58) Field of Classification Search
CPC ... H04N 19/124; H04N 19/147; H04N 19/176
USPC .................................................... 375/240.03
See application file for complete search history.

(56) References Cited

U.S. PATENT DOCUMENTS

2014/0376622 A1* 12/2014 Yu ........................ H04N 19/126 375/240.03
2018/0324462 A1* 11/2018 Puri ..................... H04N 19/184
2022/0329802 A1* 10/2022 Meardi ................ H04N 19/184

FOREIGN PATENT DOCUMENTS

CN 105940677 A * 9/2016 ............ H04N 19/82

* cited by examiner

*Primary Examiner* — Behrooz M Senfi
(74) *Attorney, Agent, or Firm* — IP Strategy Consulting

(57) ABSTRACT

Systems and methods for intelligent quantization for video compression are provided. In some embodiments, the methods and systems estimate a rate-distortion function is for video coding. An offset to a reconstruction process is applied, where the offset is determined based upon a frequency dependent variable and a quantization step size. The offset is then derived by transmitting the frequency dependent variable to a decoder. Additionally, a transform coefficient may be estimated as either a Laplacian or Cauchy distributions with a mean of zero and $\alpha$ as a frequency dependent parameter. The offset at an encoder may be modified based on the frequency dependent variable. Modifying the offset minimizes overall distortion by moving the quantization step size closer to a centroid of the Laplacian or Cauchy distribution. Additionally, a quantization bin size may be altered to optimize distortion, and the system may determine which frequency coefficients to utilize.

14 Claims, 6 Drawing Sheets

SYSTEMS AND METHODS FOR INTELLIGENT QUANTIZATION

BACKGROUND

The present invention relates in general to the field of video compression, and more specifically to methods, computer programs and systems for intelligent quantization.

Video compression standards are designed to enable reduced bandwidth and size of video content, while maintaining high levels of video quality. Current High Efficiency Video Coding (HEVC) is a video compression standard that offers significant data compression as compared against Advanced Video Coding (AVC) with comparable levels of video quality at the same or similar bit rate. HEVC uses both integer discrete cosine transform (DCT) with varied block sizes, and discrete sine transform (DST) with 4×4 block sizes. Essentially, the standard compares different parts of a frame of the video to find areas that are redundant both within a single frame and between consecutive frames. Redundant areas are then replaced with short descriptions instead of the original pixels.

An essential part of HEVC is the usage of motion vector (MV) prediction. MV is a form of motion estimation that describes the transformation from one 2D image to another. Typically, this occurs between adjacent frames in the video sequence. Motion vectors may relate to the whole image (global motion estimation) or specific parts, such as rectangular blocks or arbitrary patches or even on a per pixel basis. In HEVC, a motion vector is defined as a two-dimensional vector used for inter prediction that provides an offset from the coordinates in the decode picture to the coordinates in a reference picture.

In current HEVC, to balance precision of MV and coding cost of encoding the MV, a quarter pixel accuracy of the MV has been adopted. For more advanced video coding standards, higher precision MV may be utilized.

After prediction occurs for a given block of pixels, there are residuals of the block that must be contended with in order to have a high-quality image. A transform and quantization are utilized to compress the residual signal. Traditional quantization uses a predetermined quantization step size or quantization matrix. Transformation function is used to convert the image/frame from the pixel domain to the frequency domain. For example, DCT is a technique applied to image in the pixel domain to transform them into the frequency domain in which redundancy is compacted. In video coding standards DCT is applied to each block residuals.

Quantization is the inevitable result of representing a value as a number with a fixed number of decimal places. From the DCT coefficient the quantization scale code is divided element-wise by a quantization matrix and rounds each resulting element. The quantization parameter determines the step size for associating the transform coefficients with a finite set of steps. The value is directly proportionate to the compression ratio. Quantization and inverse quantization formulas are applied to the transform signal. Inverse DCT is applied to the DCT coefficient blocks after quantization and inverse quantization are performed. Using a predetermined quantization step size or quantization matrix fails to optimize the rate-distortion cost.

Given that there is great value in minimizing rate-distortion cost and ensuring the optimal quantization is performed, intelligent quantization systems and methods are provided.

SUMMARY

The present systems and methods relate to video compression, and particularly intelligent quantization when video coding. Such systems and methods enable lower rate-distortion costs in the coded video frames.

In some embodiments, the methods and systems for intelligent quantization are provided. In this system and method an estimate of a rate-distortion cost is determined for video coding. An offset to a reconstruction process is applied, where the offset is determined based upon a frequency dependent variable and a quantization step size. The offset is then derived by transmitting the frequency dependent variable to a decoder. Additionally, a transform coefficient may be estimated as either a Laplacian or Cauchy distributions with a mean of zero and $\alpha$ as a frequency and content dependent parameter. The offset at an encoder may be modified based on the frequency and content dependent variable. Modifying the offset minimizes overall distortion by moving the quantization step size closer to a centroid of the Laplacian or Cauchy distribution of each quantization bin. Additionally, a quantization bin size may be altered to optimize distortion, and the system may determine which frequency coefficients to utilize. Frequency coefficients at or below a threshold are quantized to zero and are not utilized and frequency coefficients above the threshold result in transmission of the quantization bin size and frequency dependent variable to a decoder. In some embodiments, the distortion function is estimated using the Laplacian or Cauchy distribution and a rate function is estimated by an entropy of each quantization bin.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

Figure 1:
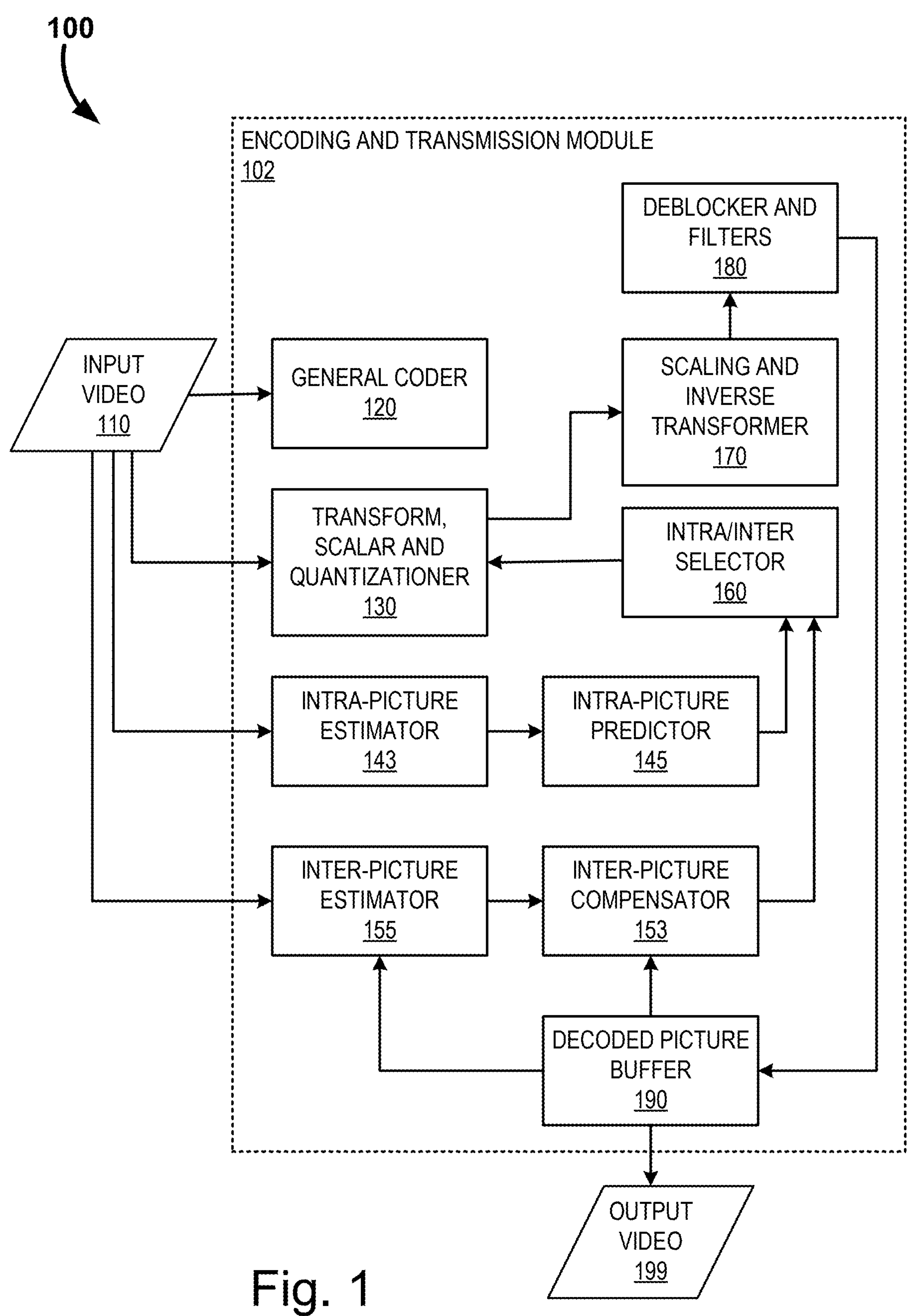
FIG. 1 is an example block diagrams of a system for encoding and transmitting video content, in accordance with some embodiment.

The present invention relates to systems and methods for intelligent quantization when coding video content. To facilitate discussions, FIG. 1 is an example of a system for High Efficiency Video Coding (HEVC), shown generally at 100. Coding standards are designed to achieve the highest coding efficiency possible. Coding efficiency is the ability to encode video at a minimized bitrate while achieving a quality threshold. The encoder system 102 splits an inbound picture into block shaped regions for a first picture frame, or the first frame of a random-access point using intra-picture prediction. Intra picture prediction is where prediction of blocks/pixels in the given frame is predicted by using other pixels within the same frame. After the first frame is predicted using intra-picture prediction, the other frames may be predicted using inter-picture prediction techniques. Inter-picture prediction is the prediction of block content based upon the adjacent frame data. After prediction methods are finished, the picture goes through loop filters and the final picture representation is stored in a decoded picture buffer. Images stored in the decoded picture buffer are available for use to predict yet other pictures.

In this system an input video 110 is received by a number of sub-components of the encoding and transmission module 102. These sub components include a general coder 120 and transform, scalar and quantizationer 130, intra-picture estimator 143 and an inter-picture estimator 155. The general coder 120 generates general control data, which is provided to the header formatting and CABAC to incorporate into the coded bitstream. General control data is also provided to the transform, scalar and quantizationer 130, the intra-picture estimator 143, and the inter-picture estimator 155 (not illustrated).

Transform, scalar and quantizationer 130 performs scaling and transform functions on the input video frame and provided output as quantized transform coefficients to the header formatting and a context-adaptive binary arithmetic coding (CABAC) algorithm to incorporate into the coded bitstream. Output is also provided to the scaling and inverse transformer 170. Transform units of various sizes may be used to code the prediction residuals. These transform units may be transformed using discrete cosine transforms or discrete sine transforms. The scaling and inverse transformer 170 in turn provides output to the deblocker and filtering module 180, as well as the intra-picture estimator 143 and intra-picture predictor 145.

The transform, scalar and quantizationer 130 is the component which performed the intelligent quantization. In intelligent quantization an offset is selected that minimizes the rate-distortion cost. In some embodiments the rate distortion cost is given by the following equation:

rate distortion cost function $$\min(D+\lambda R) \qquad \text{Equation 1}$$

In this equation 1, D is the distortion, R is the rate and $\lambda$ is the Lagrange multiplier. The quantization process is performed given the following equation:

$$Z=\text{floor}\left(\frac{|W|+f}{\Delta}\right)\text{sign}(W) \qquad \text{Equation 2: Quantization Function}$$

And the dequantized value can be calculated as:

$$W'=Z\Delta \qquad \text{Equation 3: Dequantization Function}$$

In the prior Equations 2 and 3, f is the offset, W is the transform coefficient, and $\Delta$ is the quantization step size, W' is the dequantized coefficient.

The intra-picture estimator 143 uses a variety of prediction algorithms to estimate pixel values from neighboring pixels within the same frame. Output from the intra-picture estimator 143 is provided to an intra-picture predictor 145 which consumes the estimations and generates a prediction of the pixels of interest. Conversely, an inter-picture estimator 155 received adjacent frame data from a decoded picture buffer 190 and estimates motion between one frame to an adjacent frame. Output of the motion estimation is provided to the inter-picture compensator 153 as well as the header formatting and CABAC to incorporate into the coded bitstream (not illustrated).

The inter-picture compensator 153 generates motion compensation information. A selector 160 picks between the intra-picture predicted image data and the inter-picture motion compensated data. This information is fed back to the transform, scalar and quantizationer 130 and the deblocker and filtering module 180 (not illustrated).

The deblocker and filtering module 180 generates filtering control data, which is provided to the header formatting and CABAC to incorporate into the coded bitstream (not illustrated). Deblocked and filtered data is also provided to the decoded picture buffer 190. Output of the decoded picture buffer 190 includes the output video 199.

Figure 2:
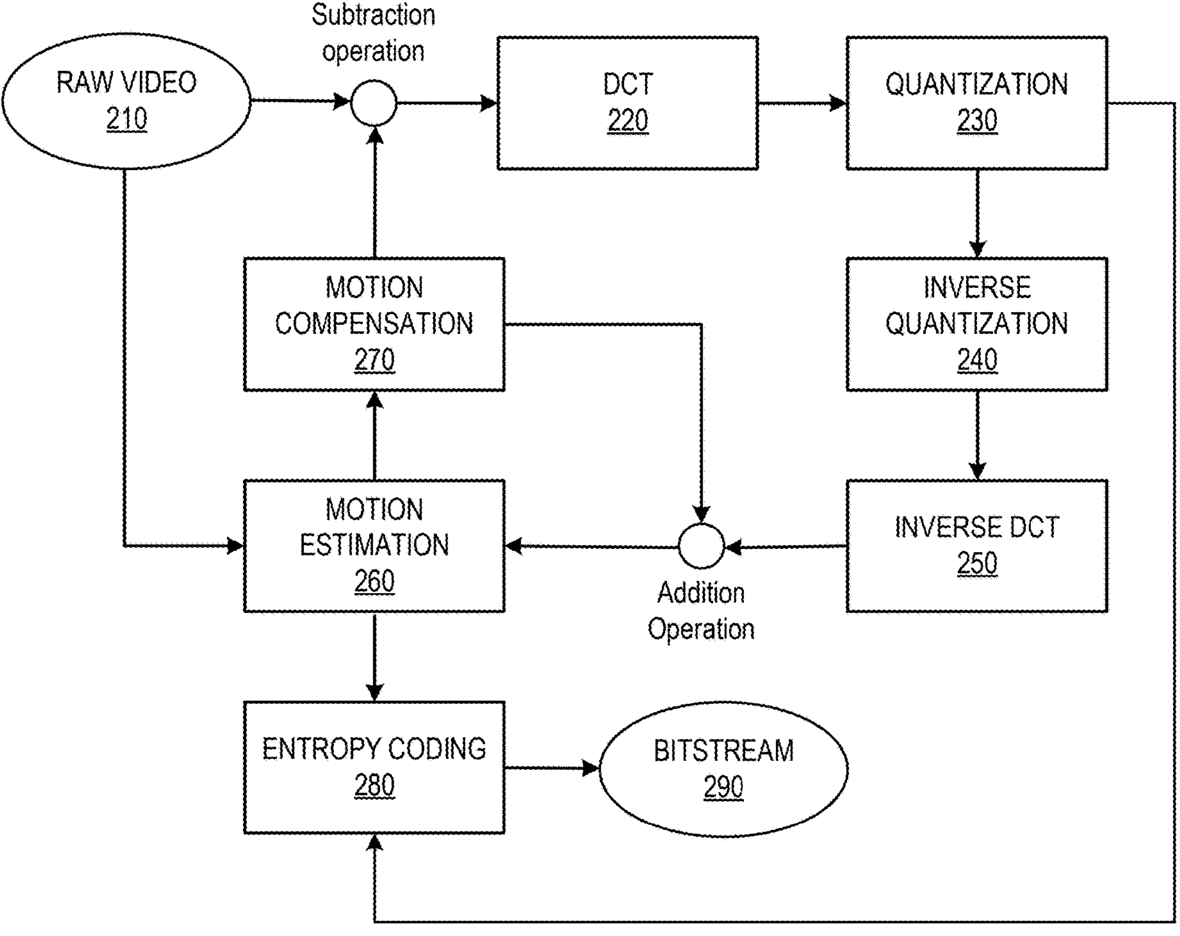
FIG. 2 is an example block diagram for the logical stages taken when coding video, in accordance with some embodiments.

Turning to FIG. 2, a block diagram is provided for the logical flow and transformation of data for the generation of a bitstream 290 from a raw video 210. Initially, the raw video 210 is subjected to a subtraction operation. Subtraction includes dividing the frame into blocks in one or more sizes. In some embodiments, the blocks range in size from 4×4 to 64×64 pixels. Next a two-dimensional discrete cosine transform (DCT) 220 is applied to each block. DCT significantly reduces the amount of memory and bandwidth of the compressed video. DCT 220 is applied to each residual values, including from intra-coding and inter-coding.

After DCT 220 the output is provided to quantization module 230. The quantization scale code is divided element-wise by a quantization matrix and rounds each resultant element. A quantization parameter determines the step size for associating the transformed coefficients with a finite set of steps. The residuals are next reconstructed by inverse quantization 240 and inverse DCT 250 respectively. The resulting residual blocks may be reassembled in an addition function with the motion compensation results from 270.

Motion estimation 260 utilizes the de-blocked output, as well as the raw video 210 in order to encode one frame in terms of another. Motion estimation 260 encodes the frame data by modified forms of another adjacent frame(s). The goal of motion estimation is to find the best match between regions in the two adjacent frames. The input of motion estimation is macroblocks and search areas. The motion estimation 260 performs block motion estimation which computes motion vectors (MVs) using search algorithms. The most basic search method is using the full search algorithm which processes all pixels in the search range to find the best block matching via a cost function. The output of the motion estimation is provided to motion compensator 270 with in turn is used in the addition process. Additionally, output from the motion estimation, as well as output from the quantization step, is provided to an entropy coder 280.

The entropy coder 280 is a lossless data compression scheme. It creates and assigns a unique prefix code to each unique symbol in the input. Entropy coding is executed on the quantization results from each macroblock to generate the bitstream 290.

Figure 3:
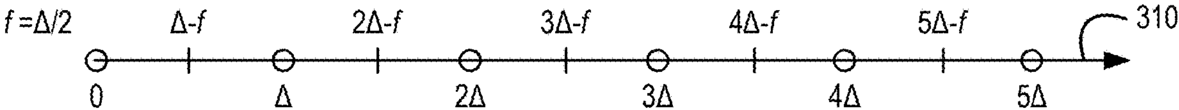
FIG. 3 is an example illustration of quantization step sizes on a transformed coefficient with differing offsets, in accordance with some embodiments.
Figure 3:
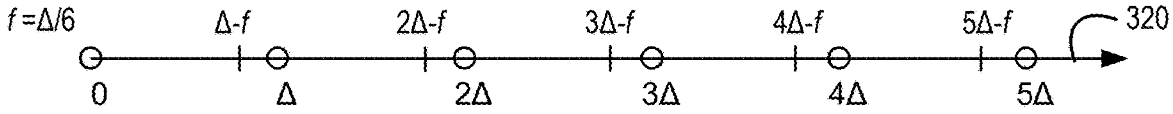
Figure 4:
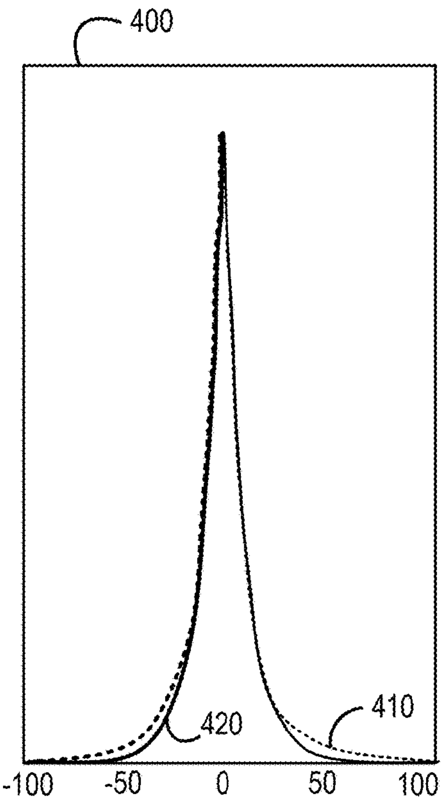
FIG. 4 is an example illustration of Laplacian and Cauchy distributions of transform coefficients, in accordance with some embodiments.

Turning to FIG. 3, an example of the quantization process is provided. In this example illustration, two lines representing a reconstruction process W' are provided. The top line 310 is the reconstruction process for intra prediction, and the bottom line is the reconstruction process for the inter prediction. For these reconstruction processes, representative values for W' are provided on a fixed interval Δ (quantization step size), as shown as bubbles along the lines 310 and 320. However, for inter prediction and intra prediction the parameter f is different. This results in decision points, illustrated as short lined along the reconstruction process W', occurring at different locations when comparing intra prediction versus inter prediction. For example, assume the top reconstruction process W' 310 has a parameter f that is Δ/2. This results in a decision level occurring halfway to the representative W' values. Comparatively, for inter prediction, at the bottom line 320, the parameter f is Δ/6. This results in a decision level occurring much closer to the representative values. Traditional reconstruction process is a fixed process provided by the following equation:

$$W' = \Delta \times Z \qquad \text{Equation 4: fixed reconstruction process}$$

Where Δ is the interval to a representative value and Z is the number of intervals. Presently, the proposal is to utilize an offset for the reconstruction process, provided by the following equation:

$$W' = Z\Delta + f' \qquad \text{Equation 5: offset reconstruction process}$$

Where f' is determined based upon the α and Δ. The parameter a is frequency and content dependent. This results in shifting the reconstructed value W' to be the centroid of the quantization bin (ZΔ−f, (Z+1) Δ−f). The offset f' may be derived by transmitting a to the decoder. In another embodiment, f' may be fixed for each quantization frequency. The offset f' for each interval Z may be calculated by the following equation:

$$f'_Z = \min_{f'} \int_{Z\Delta-f}^{Z\Delta+\Delta-f} (x - Z\Delta - f')^2 p(x)dx \qquad \text{Equation 6: Offset calculation}$$

Where p(x) is the probability distribution for each x, and wherein x is each of the transformed coefficients. Turning to FIG. 4, an example of two distributions is provided. They include a Laplacian distribution, shown by line 420, and a Cauchy distribution, shown by line 410. Transform coefficients usually follow a distribution that resembles a Laplacian distribution or Cauchy distribution. A Laplacian distribution may be used as an estimation of the transform coefficients. A Laplacian distribution is provided by the following equation:

$$p(x) = \frac{\alpha}{2} e^{-\alpha|x|} \qquad \text{Equation 7: Laplacian distribution}$$

An assumption may be made that the mean of the distribution is zero. The optimal quantization should lead to the minimum rate distortion cost as provided in Equation 1. Here the distortion can be estimated using this Laplacian distribution p(x) and interval Δ. The rate can be estimated by the entropy of each quantization bin. For example, using this estimation, distortion may be calculated by the following equation:

$$D = \int_{f-\Delta}^{\Delta-f} x^2 p(x)dx + 2\sum_{i=1}^{N} \int_{i\Delta-f}^{i\Delta+\Delta-f} (x - i\Delta)^2 p(x)dx \qquad \text{Equation 8: Distortion Estimation}$$

And rate may be estimated as the following equation:

$$R = -P_0 \log P_0 - 2\sum_{i=1}^{N} P_i \log P_i \qquad \text{Equation 9: Rate Estimation}$$

Where $P_i$ is given by the following equation:

$$P_i = \begin{cases} \int_{f-\Delta}^{\Delta-f} p(x)dx, & i = 0 \\ \int_{i\Delta-f}^{i\Delta+\Delta-f} p(x)dx, & i = 1 \ldots N \end{cases} \qquad \text{Equation 10}$$

It is also possible to modify the offset at the encoder f based on the α of each frequency. By altering f it is possible to make ZΔ closer to the centroid thereby minimizing the overall distortion. This may be solved with the following equation:

$$f^{opt} = \min_f \int_{f-\Delta}^{\Delta-f} x^2 p(x)dx + 2\sum_{i=1}^{N} \int_{i\Delta-f}^{i\Delta+\Delta-f} (x-i\Delta)^2 p(x)dx$$

Equation 11: Offset Optimization Function

It is also possible to change the quantization bin size to reach the optimal rate distortion. Given the λ and the α it is possible to derive the optimal quantization bin size and corresponding centroid of each quantization bin. The λ and the α may be transmitted to the decoder such that the inverse quantization may be derived automatically. This may be solved for the following equation:

$$\min_{B_i} D + \lambda R$$

Equation 12: Optimal Bin Size

Where B is the bin size, and given that:

$$D = \int_{-B_0}^{B_0} x^2 p(x)dx + 2\sum_{i=1}^{N} \int_{B_{i-1}}^{B_i} (x - i\Delta - f_i')^2 p(x)dx$$

Equation 13: Distortion by Bin Size

And where the rate R is given by Equation 9, and where the rate estimation is subject to the following:

$$P_i = \begin{cases} \int_{-B_0}^{B_0} p(x)dx, & i = 0 \\ \int_{B_{i-1}}^{B_i} p(x)dx, & i = 1 \ldots N \end{cases}$$

Equation 14

Based on the above method of optimizing bin size B it is also possible to selectively determine which frequency coefficient to use. For high frequencies, most coefficients are quantized to zero and do not require the transmission of λ and the α. Therefore, the system may signal to the decoder which frequency coefficient will employ the above-described quantization methods.

Figure 5:
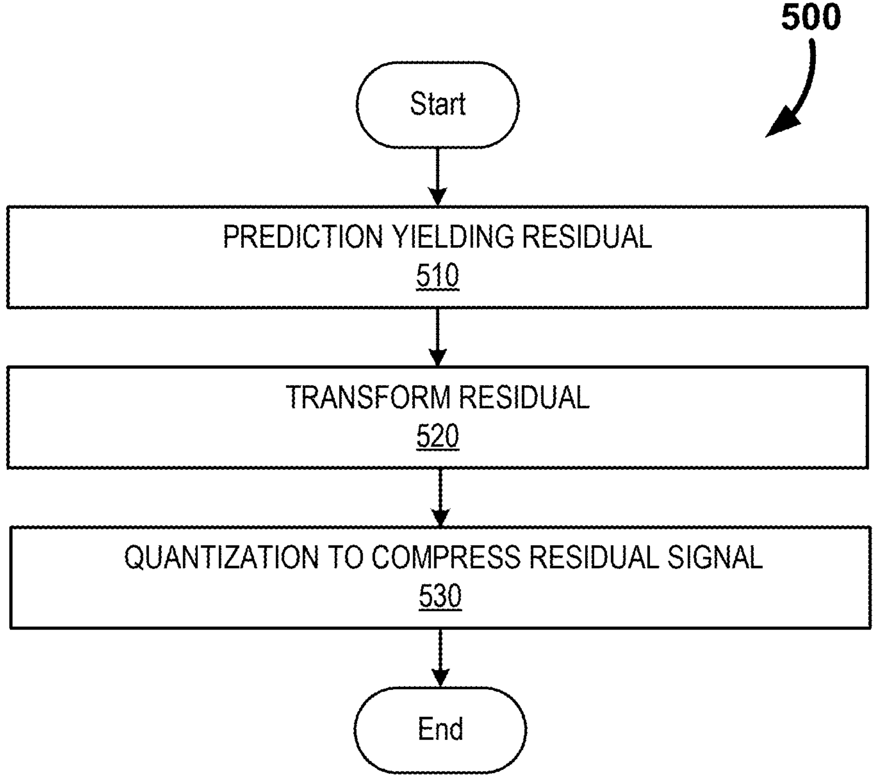
FIG. 5 is a flow diagram for an example process of transformation and quantization of a video signal, in accordance with some embodiments.
Figure 6:
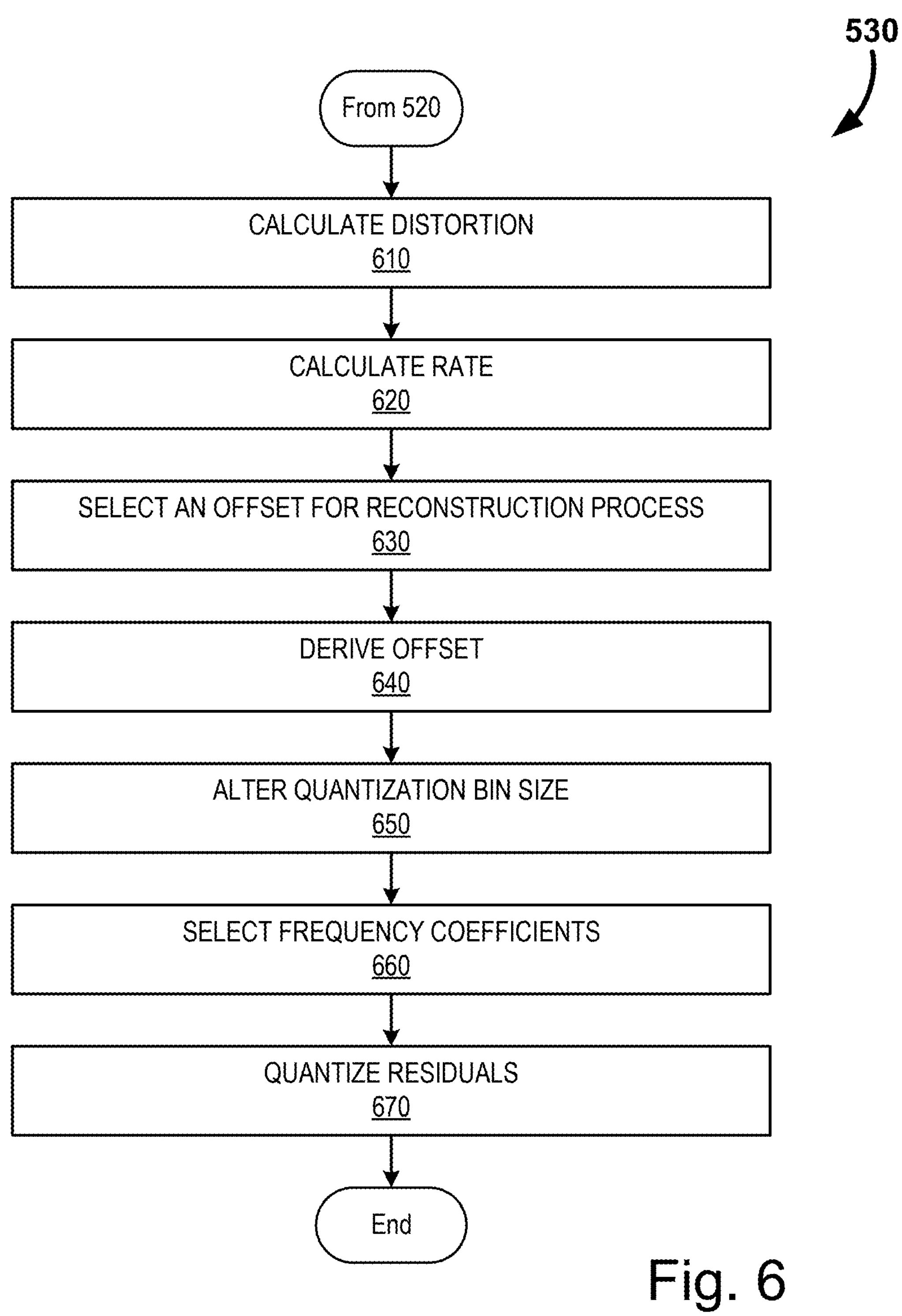
FIG. 6 is a flow diagram for an example sub-process of intelligent quantization, in accordance with some embodiments.

Turning now to FIG. 5, an example flow diagram is provided for the methods of smart quantization, shown generally at 500. In this example method the prediction is first performed to yield a residual, as seen at 510. The residual is transformed using DCT or some alternate transformation algorithm, as seen at 520. Lastly the residual signal is subject to quantization, at 530. FIG. 6 provides a more detailed example process of the quantization. Initially, the distortion may be estimated using Equation 8, at 610. Likewise, the rate may be estimated using the Equation 9, at 620. An offset for the reconstruction process may be selected by optimizing Equation 5, at 630. The offset can be calculated using Equation 6, at 640. In another embodiment, the offset may be derived at the encoder using Equation 11. Next the quantization bin size may be optimized, at 650, using Equation 12. Lastly, the system may select the frequency coefficients that will utilize this quantization method, at 660. The residuals may be quantized using these optimized parameters, at 670. This ends the process.

Figure 7A:
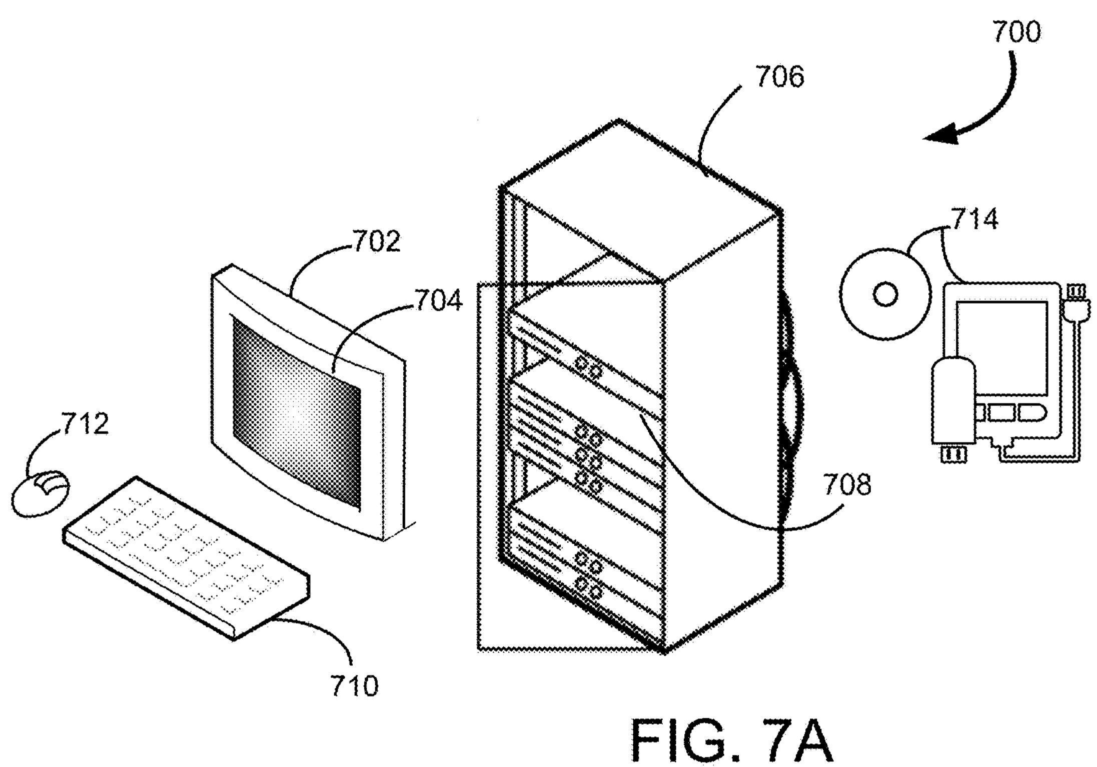
FIGS. 7A and 7B are illustrations of computer systems capable of implementing the intelligent quantization, in accordance with some embodiments.
Figure 7B:
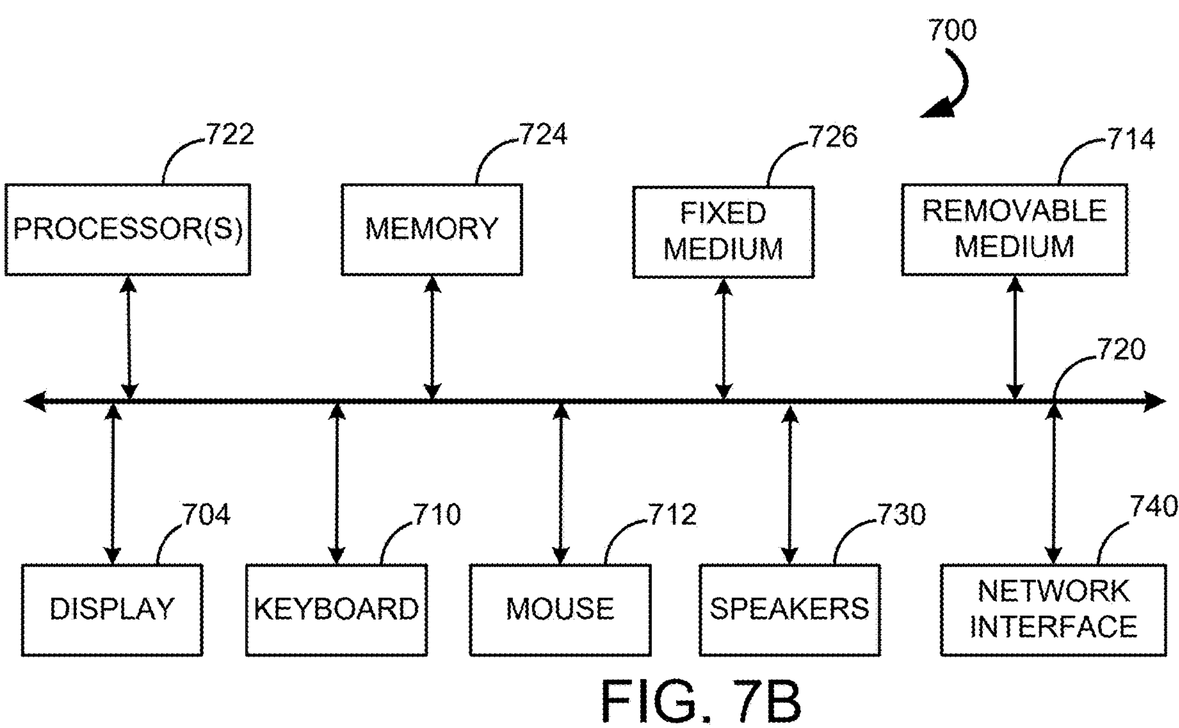

Now that the systems and methods for smart quantization have been provided, attention shall now be focused upon apparatuses capable of executing the above functions in real-time. To facilitate this discussion, FIGS. 7A and 7B illustrate a Computer System 700, which is suitable for implementing embodiments of the present invention. FIG. 7A shows one possible physical form of the Computer System 700. Of course, the Computer System 700 may have many physical forms ranging from a printed circuit board, an integrated circuit, and a small handheld device up to a huge supercomputer. Computer system 700 may include a Monitor 702, a Display 704, a Housing 706, server blades including one or more storage Drives 708, a Keyboard 710, and a Mouse 712. Medium 714 is a computer-readable medium used to transfer data to and from Computer System 700. FIG. 7B is an example of a block diagram for Computer System 700. Attached to System Bus 720 are a wide variety of subsystems. Processor(s) 722 (also referred to as central processing units, or CPUs) are coupled to storage devices, including Memory 724. Memory 724 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable form of the computer-readable media described below. A Fixed Medium 726 may also be coupled bi-directionally to the Processor 722; it provides additional data storage capacity and may also include any of the computer-readable media described below. Fixed Medium 726 may be used to store programs, data, and the like and is typically a secondary storage medium (such as a hard disk) that is slower than primary storage. It will be appreciated that the information retained within Fixed Medium 726 may, in appropriate cases, be incorporated in standard fashion as virtual memory in Memory 724. Removable Medium 714 may take the form of any of the computer-readable media described below.

Processor 722 is also coupled to a variety of input/output devices, such as Display 704, Keyboard 710, Mouse 712 and Speakers 730. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 722 optionally may be coupled to another computer or telecommunications network using Network Interface 740. With such a Network Interface 740, it is contemplated that the Processor 722 might receive information from the network, or might output information to the network in the course of performing the above-described smart quantization methods. Furthermore, method embodiments of the present invention may execute solely upon Processor 722 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 700 can be controlled by operating system software that includes a file management system, such as a medium operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, Glasses with a processor, Headphones with a processor, Virtual Reality devices, a processor, distributed processors working together, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer (or distributed across computers), and when read and executed by one or more processing units or processors in a computer (or across computers), cause the computer(s) to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computerized method for intelligent quantization is provided comprising:

determining an estimate of a rate-distortion function for video coding;

applying an offset to a reconstruction process, where the offset is determined based upon a frequency dependent variable and a quantization step size;

deriving the offset by transmitting the frequency dependent variable to a decoder;

estimating a transform coefficient as either a Laplacian or Cauchy distributions with a mean of zero and a as a frequency and at least one content dependent parameter; and modifying the offset at an encoder based on the frequency and the at least one content dependent variable, wherein the modifying the offset minimizes overall distortion by moving a reconstructed value in a quantization bin to be a centroid of the Laplacian or Cauchy distribution.

2. The method of claim 1, further comprising altering a quantization bin size to optimize distortion.

3. The method of claim 2, further comprising determining which frequency coefficients to utilize.

4. The method of claim 3, wherein frequency coefficients at or below a threshold are quantized to zero and are not utilized and frequency coefficients above the threshold result in transmission of the quantization bin size and frequency dependent variable to a decoder.

5. The method of claim 1, wherein a distortion function is estimated using the Laplacian or Cauchy distribution and a rate function is estimated by an entropy of each quantization bin.

6. The method of claim 5, wherein the quantization is given by:

$$Z = \text{floor}\left(\frac{|W| + f}{\Delta}\right)\text{sign}(W)$$

Where $$W' = Z\Delta$$

Where W is a transform coefficient, Δ is a quantization step size, f is the offset, and Z is an integer.

7. The method of claim 6, wherein the offset to a reconstruction process is provided as: W'=ZΔ+f'.

8. A computerized video coding system with intelligent quantization is provided comprising:

a blocking module for blocking a video image;

a transformer for transforming the individual blocks;

a quantizer for determining an estimate of a rate-distortion function for video coding, applying an offset to a reconstruction process, where the offset is determined based upon a frequency dependent variable and a quantization step size, deriving the offset by transmitting the frequency dependent variable to a decoder, estimating a transform coefficient as either a Laplacian or Cauchy distributions with a mean of zero and α as a frequency and at least one content dependent parameter, and modifying the offset at an encoder based on the frequency and the at least one content dependent variable, wherein the modifying the offset minimizes overall distortion by moving a reconstructed value in a quantization bin to be a centroid of the Laplacian or Cauchy distribution.

9. The system of claim 8, wherein the quantizer is further configured to alter a quantization bin size to optimize distortion.

10. The system of claim 9, wherein the quantizer is further configured to determine which frequency coefficients to utilize.

11. The system of claim 10, wherein frequency coefficients at or below a threshold are quantized to zero and are not utilized and frequency coefficients above the threshold result in transmission of the quantization bin size and frequency dependent variable to a decoder.

12. The system of claim 8, wherein a distortion function is estimated using the Laplacian or Cauchy distribution and a rate function is estimated by an entropy of each quantization bin.

13. The system of claim 12, wherein the quantization is given by:

$$Z = \text{floor}\left(\frac{|W| + f}{\Delta}\right)\text{sign}(W)$$

Where $$W' = Z\Delta$$

Where W is a transform coefficient, Δ is a quantization step size, f is the offset, and Z is an integer.

14. The system of claim 13, wherein the offset to a reconstruction process is provided as: W'=ZΔ+f'.

* * * * *